United States Patent [19]
Funke

[11] Patent Number: 5,379,954
[45] Date of Patent: Jan. 10, 1995

[54] GRATER WITH CLEANING BRUSH

[75] Inventor: Peter Funke, Sundern, Germany

[73] Assignee: Gebruder Funke KG, Sundern, Germany

[21] Appl. No.: 118,491

[22] Filed: Sep. 9, 1993

[30] Foreign Application Priority Data

Feb. 5, 1993 [DE] Germany ............ 9301607[U]
Jul. 9, 1993 [DE] Germany ............ 9310232[U]

[51] Int. Cl.⁶ ............................................ A47J 43/25
[52] U.S. Cl. ................... 241/101.2; 241/168; 241/273.1
[58] Field of Search ..... 30/95, 166, 273.1, 273.2.101.2

[56] References Cited

U.S. PATENT DOCUMENTS 129,426  7/1872  Rickards ............... 241/273.1
4,572,443  2/1986  Coleman ............... 241/166

FOREIGN PATENT DOCUMENTS 51938    5/1890   Germany .
804113   4/1951   Germany .
2435743  2/1976   Germany ............... 241/95
8233223  12/1985  Germany .

Primary Examiner—Douglas D. Watts
Attorney, Agent, or Firm—Herbert Dubno; Andrew Wilford

[57] ABSTRACT

A grater assembly for foodstuffs according to the invention has a grater board having an outer frame and a central panel formed with an array of small, throughgoing, sharp edge grater holes. A brush has a rigid handle and an array of bristles projecting therefrom, and a holder formation on the frame shaped to interfit with the handle of the brush retains the brush on the frame.

17 Claims, 3 Drawing Sheets

FIG. 1
FIG. 2
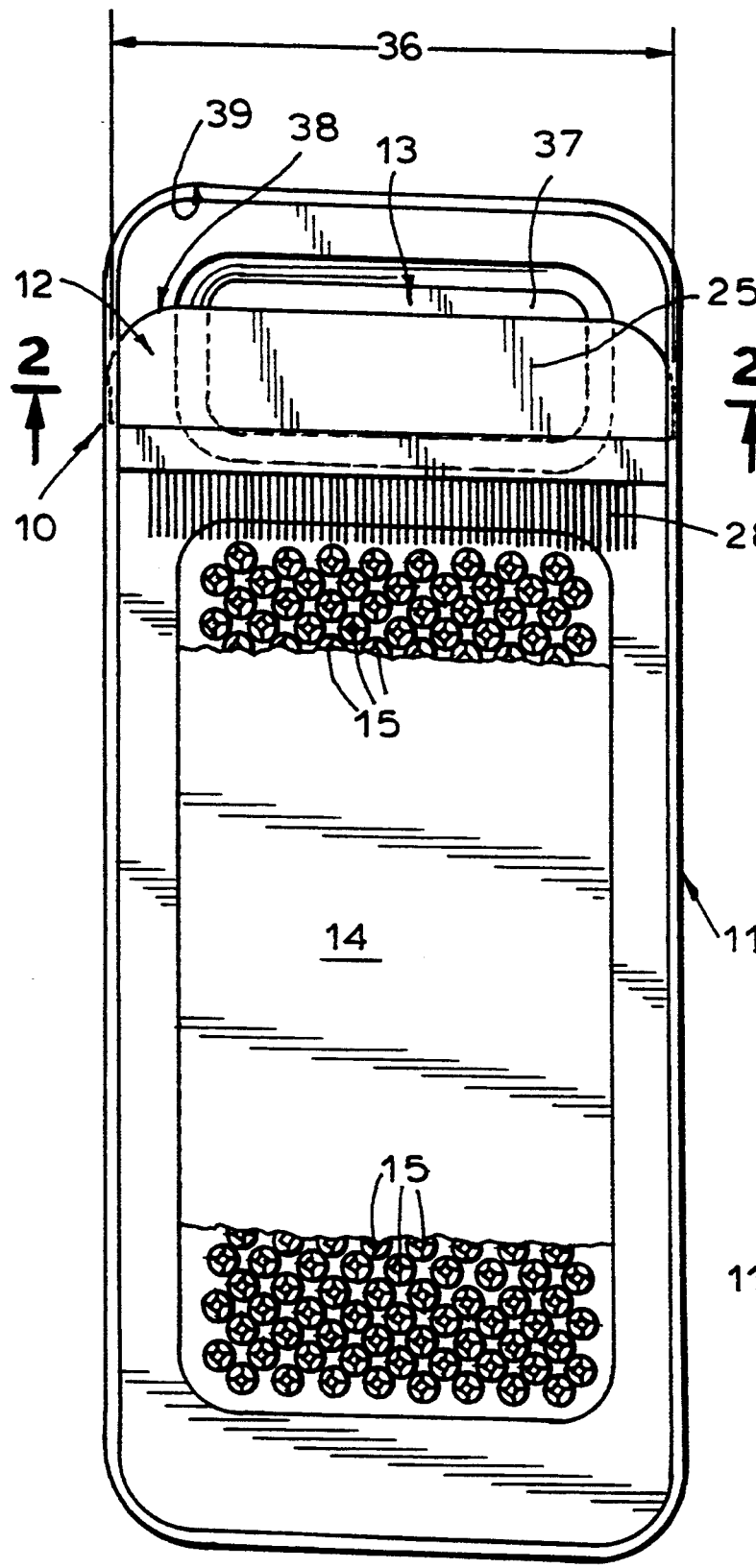
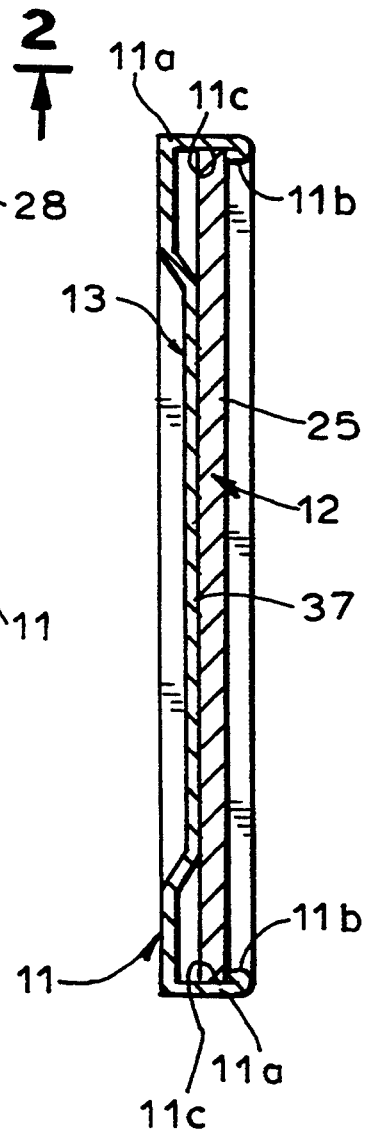

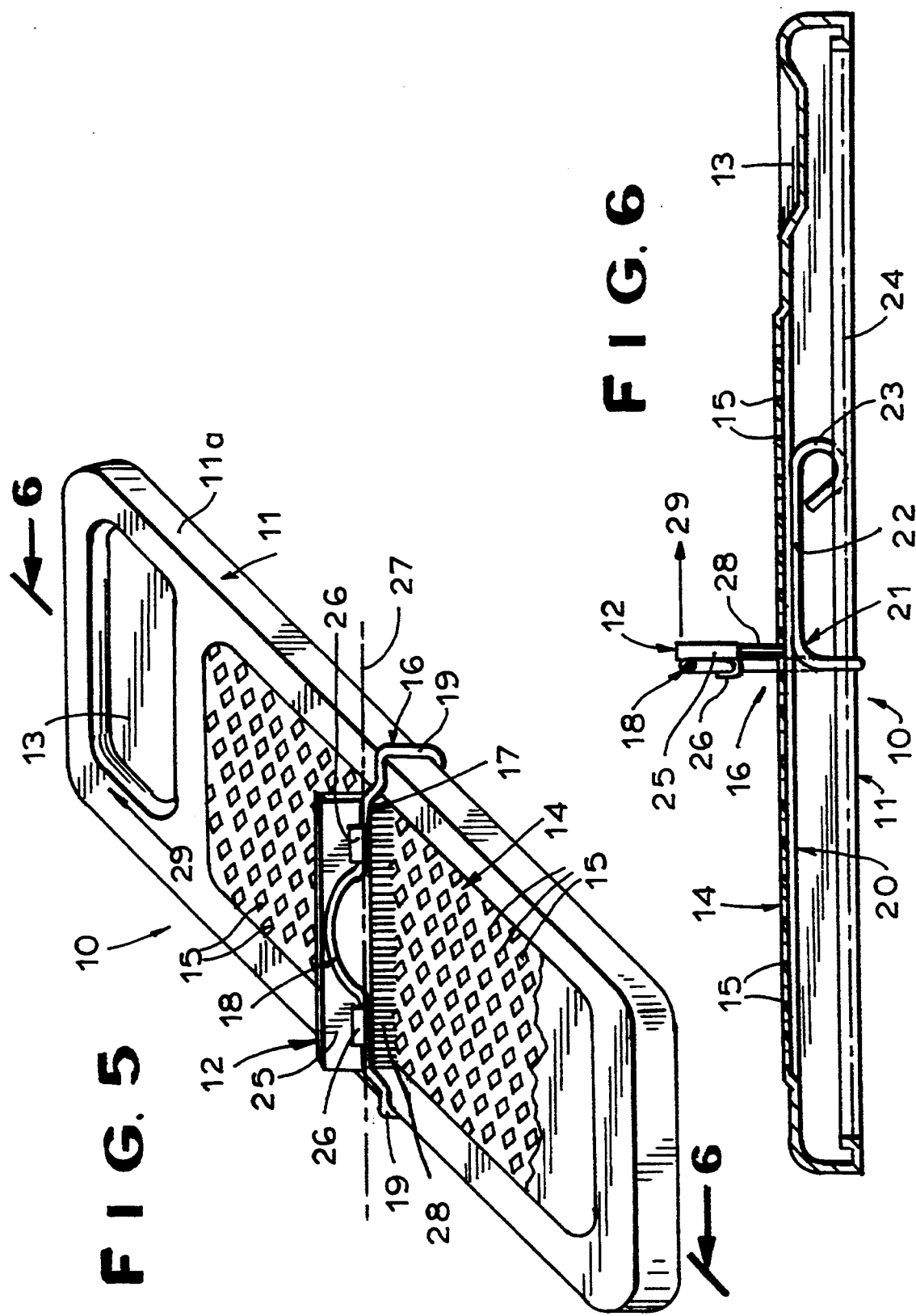

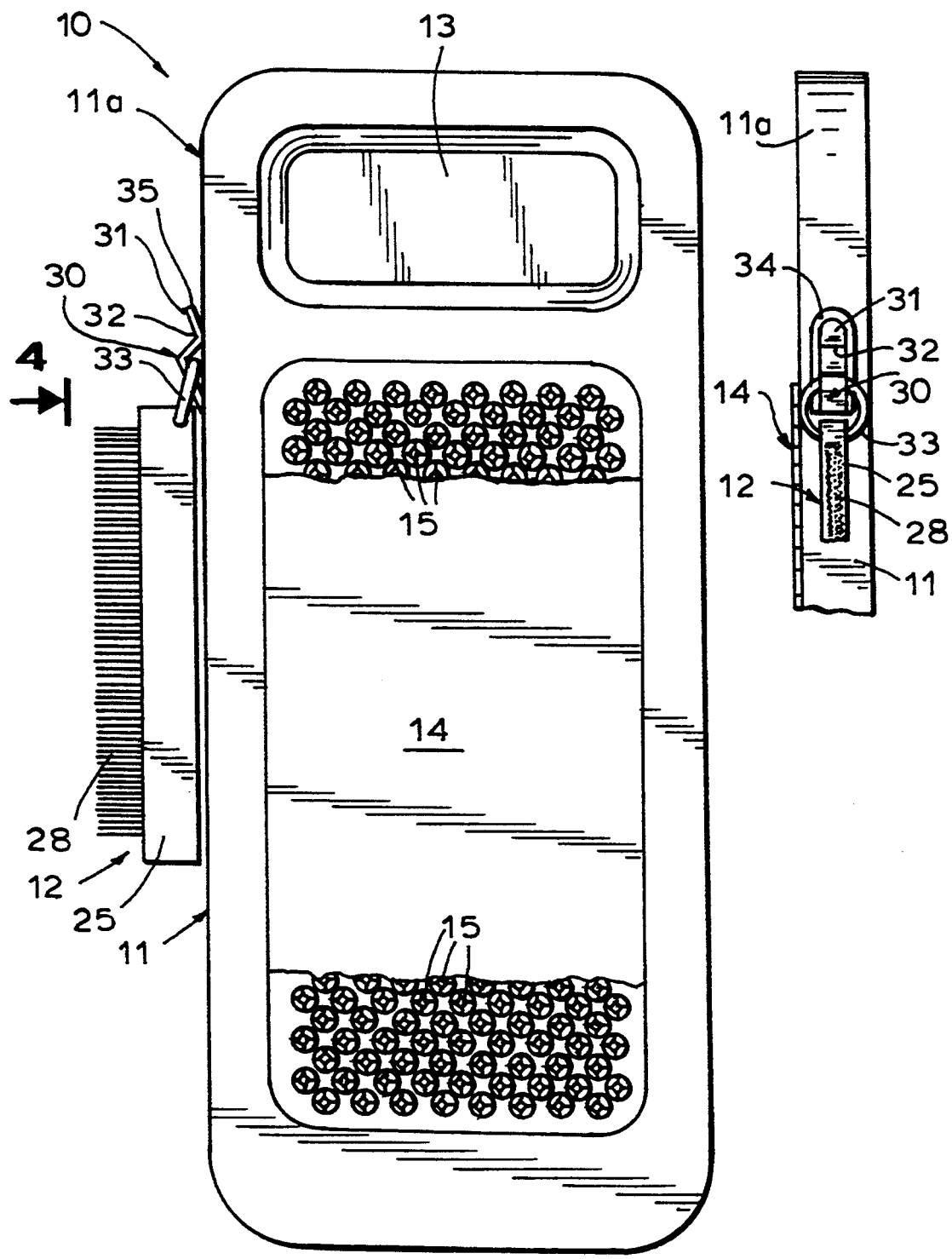

GRATER WITH CLEANING BRUSH

FIELD OF THE INVENTION

The present invention relates to a grater. More particularly this invention concerns a grater of the type used in cooking, for the shredding of fruit, grating of nuts, and the like.

BACKGROUND OF THE INVENTION

A grater particularly intended for use with nutmeg is described in German patent 51,938 of Charles Blood. It has a grater board formed with an array of sharp-edged holes and forming a pair of longitudinal guides flanking the hole array. A piston-like nut holder can slide longitudinally over the hole array while pressing a nut against it to abrade pieces from the nut. A cleaner plate has bumps that engage between the rows of holes on the plate and is carried by the nut-holder slide to clear the board of particles with each stroke. Such an arrangement cannot dislodge pieces actually caught in the holes. Furthermore if used with a stickier foodstuff, such as citrus peel, it would surely clog very quickly.

Similarly, U.S. Pat. No. 4,572,443 of Coleman has a grater board with no throughgoing holes, but instead formed with deflectable teeth. A complex holder arrangement can be stroked across the grater surface to abrade particles from a piece of meat held in it while dislodging those abraded particles from the grater teeth so they drop down for collection. This arrangement is not suitable for standard grating tasks, and is fairly complex.

OBJECTS OF THE INVENTION

It is therefore an object of the present invention to provide an improved grater assembly.

Another object is the provision of such an improved grater assembly which overcomes the above-given disadvantages, that is which can easily be cleaned even when used to grate nuts, citrus fruits, or the like.

SUMMARY OF THE INVENTION

A grater assembly for foodstuffs according to the invention has a grater board having an outer frame and a central panel formed with an array of small, throughgoing, sharp edge grater holes. A brush has a rigid handle and an array of bristles projecting therefrom, and a holder formation on the frame shaped to interfit with the handle of the brush retains the brush on the frame.

Thus according to the instant invention the grater holes can be cleaned with a brush that is always ready to hand. The cleaning operation is not dependent on the operation of a food holder as in the prior art, but can be carried out at any time. Furthermore the bristles of the brush can be counted on to get into the holes of the grater to dislodge any particles therein, regardless of how the holes of the array are relatively positioned.

According to further features of the invention the bristles are stiff and are thin enough to fit through the holes. The formation can be a socket formed in the frame and complementarily receiving the brush handle. It can also be a hook integrally formed on the frame and the brush is provided with an eye through which the hook engages. In the latter case the frame is made of sheet metal and the hook is formed as a punched-out portion of the frame sheet metal. Furthermore the hook is generally S-shaped, is elastically deformable, and has a portion normally elastically engaging a surface of the frame.

In another system according to the invention the formations are a pair of grooves formed in the frame and receiving respective ends of the brush. The grooves are positioned offset from the panel to hold the brush away from the holes when the brush is engaged in the grooves. Furthermore, the frame has an overreaching rim forming the grooves and engaging over the brush handle when the brush is in the formation and the handle has a thickness that is slightly greater than a width of the grooves so that the brush is snugly held in the grooves when engaged therein. The brush has a handle region and the grooves are formed at the handle region. Thus, the brush is small enough to fit into the grooves at the handle region without projecting to the holes. In addition the brush handle and the frame have generally identical edges that generally align on fitting of the brush to the formation. The grater board is formed with a recessed handle region that engages resiliently against the brush handle when the brush is engaged in the formation.

In another system according to the invention the formation is a guide extending longitudinally a full length of the array of holes and the brush can slide in the guide with the bristles engaging the panel. The brush handle includes a slide rod having ends engaged around the grater board with the guide. Furthermore the guide is formed by a pair of longitudinal tracks transversely flanking the hole array and the slide rod forms a stop and the brush can pivot on the slide rod between a position engaging the stop and extending generally perpendicular to the board and a position extending generally parallel to the board and out of contact with the stop.

According to the invention the brush handle and the grater board are of substantially the same width and the bristle array has a length at least equal to a width of the hole array. Thus the brush is oriented perpendicular to the board and is swept over the array to clear the holes in a single stroke.

BRIEF DESCRIPTION OF THE DRAWING

The above and other objects, features, and advantages will become more readily apparent from the following description, reference being made to the accompanying drawing in which:

FIG. 1 is a front elevational view of a grater assembly according to the invention;

FIG. 2 is a section taken along line II—II of FIG. 1;

FIG. 3 is a view like FIG. 1 of another grater assembly in accordance with this invention;

FIG. 4 is a detail edge view taken in the direction of arrow IV of FIG. 3;

FIG. 5 is a perspective view of a further grater assembly according to the invention; and FIG. 6 is a longitudinal section taken along line VI—VI of FIG. 5.

SPECIFIC DESCRIPTION

As seen in FIGS. 1 and 2 a grater assembly 10 according to this invention basically comprises a grater board 11 and a brush 12. The board 11 has an outer edge 11a and is subdivided into a recessed handle region 13 and a central grating region 14 formed with an array of sharp-edge holes 15. The brush 12 has a rigid handle part 25 from which projects an array of stiff bristles 28 that are thin enough to pass through the holes 15.

As can be seen also in FIG. 2 the rim or edge 11a of the board 11 is bent inward at 11b to form a pair of inwardly open guide grooves 11c in which outer ends of the handle 25 are slidably received. The overall length of the handle 25 is slightly more than the transverse distance 36 between the bases of the grooves 11c formed by the bent-in edges 11b so that the brush 12 is snugly held when wedged therein. In addition when fitted to these guide grooves 11c the brush bears against a back surfaces 37 of the recessed handle region 13, to further retain it frictionally in place.

When fitted in the grooves 11c the bristles 28 are clear of the holed region 14 of the board 11. In addition the end edge 38 of the brush 12 and the end edge 39 of the board 11 are of identical shape, so that when fitted in the grooves 11c the brush 12 will be completely out of the way.

In the arrangement of FIGS. 3 and 4 the board 11 is substantially identical to that of FIG. 1, as is the brush 12. Here, however, the board 11 is formed along one edge with an integral hook 30 that is generally S-shaped and that is stamped out of the sheet metal constituting the edge 11a to form a hole 34 therein. More particularly the hook 30 has a bent-in portion or corner 32 that fits in the cutout 34 and a bent-out end portion 31 with an outer end 35 so that an eye 33 provided on the brush handle 25 can be slipped under this end 31 and retained by the hook 30. As in FIGS. 1 and 2 the overall length of the array of bristles 28 is slightly greater than the transverse width of the holed region 14 of the board 11.

In FIGS. 5 and 6 the longitudinal edges 11a are of J-section and bent up to form grooves 24 in which ride ends 21 of a guide wire 16 on which the brush 12 is mounted. To this end the brush handle 25 has a pair of pivot clips 26 defining an axis 27 and in which sits a central portion of the wire 16, to either side of a bent-up U-shaped portion 18 that normally lies flatly against one face of the handle 25. Each end portion 21 of the wire 16 has a straight portion 22 that terminates in a rounded end section 23 that rides in the groove 24 to ensure that the central section 18 remains perpendicular to the plane of the central holed region 14 of the board 11.

The brush 12 can pivot about the axis 27 on the wire 16 so that as the entire guide wire 16 and brush 12 are swept in one direction, the handle 25 will come into flat engagement with the portion 18 and the bristles 28 will ride over and poke through The holes 15. When oppositely moved, the brush 12 will pivot into a position parallel to or forming a small acute angle with the plane of the region 14 so that it can return to its starting position without any brushing/cleaning action.

We claim:

1. A grater assembly for foodstuffs, the assembly comprising:
    a grater board having an outer frame and a central panel, the central panel being formed with an array of small, throughgoing, sharp edge grater holes;
    a brush having a rigid handle and an array of bristles projecting therefrom; and
    a socket formed in the frame and formed complementarily to the brush handle to interfit with the handle of the brush to retain the brush on the frame.

2. The grater assembly defined in claim 1 wherein the bristles are stiff and are thin enough to fit through the holes.

3. A grater assembly for foodstuffs, the assembly comprising:
    a grater board having an outer frame and a central panel, the central panel being formed with an array of small, throughgoing, sharp edge grater holes;
    a brush having a rigid handle, an array of bristles protecting therefrom, and an eye; and
    a hook integrally formed on the frame and engaged through the eye.

4. The grater assembly defined in claim 3 wherein the frame is made of sheet metal and the hook is formed as a punched-out portion of the frame sheet metal.

5. The grater assembly defined in claim 4 wherein the hook is generally S-shaped, is elastically deformable, and has a portion normally elastically engaging a surface of the frame.

6. The grater assembly defined in claim 1 wherein the socket is a pair of grooves formed in the frame and receiving respective ends of the brush.

7. The grater assembly defined in claim 6 wherein the grooves are positioned offset from the panel to hold the brush away from the holes when the brush is engaged in the grooves.

8. The grater assembly defined in claim 6 wherein the frame has an overreaching rim forming the grooves and engaging over the brush handle when the brush is in the socket.

9. A grater assembly for foodstuffs, the assembly comprising:
    a grater board having an outer frame and a central panel, the central panel being formed with an array of small, throughgoing, sharp edge grater holes;
    a brush having a rigid handle and an array of bristles projecting therefrom; and
    a pair of grooves formed in the frame and receiving respective ends of the brush to interfit with the handle of the brush to retain the brush on the frame, the handle having a thickness that is slightly greater than a width of the grooves, whereby the brush is snugly held in the grooves when engaged therein.

10. The grater assembly defined in claim 6 wherein the brush has a handle region and the grooves are formed at the handle region, the brush being small enough to fit into the grooves at the handle region without projecting to the holes.

11. The grater assembly defined in claim 6 wherein the brush handle and the frame have generally identical edges that generally align on fitting of the brush to the socket.

12. The grater assembly defined in claim 6 wherein the grater board is formed with a recessed handle region that engages resiliently against the brush handle when the brush is engaged in the socket.

13. The grater assembly defined in claim 1 wherein the socket is a guide extending longitudinally a full length of the array of holes and the brush can slide in the guide with the bristles engaging the panel.

14. A grater assembly for foodstuffs, the assembly comprising:
    a grater board having an outer frame and a central panel, the central panel being formed with an array of small, throughgoing, sharp edge grater holes;
    a brush having a rigid handle and an array of bristles projecting therefrom; and
    a guide extending longitudinally a full length of the array of holes, the brush being slidable in the guide with the bristles engaging the panel, the brush handle including a slide rod having ends engaged around the grater board with the guide.

15. The grater assembly defined in claim 14 wherein the guide is formed by a pair of longitudinal tracks transversely flanking the hole array.

16. The grater assembly defined in claim 15 wherein the slide rod forms a stop and the brush can pivot on the slide rod between a position engaging the stop and extending generally perpendicular to the board and a position extending generally parallel to the board and out of contact with the stop.

17. The grater assembly defined in claim 1 wherein the brush handle and the grater board are of substantially the same width and the bristle array has a length at least equal to a width of the hole array.

* * * * *